July 14, 1953     H. J. FINCH     2,645,000

TOOL FOR FINISHING TUBE ENDS

Filed Jan. 6, 1950     3 Sheets-Sheet 1

Inventor
Harry J. Finch
By H. R. Harris
Attorney

July 14, 1953 H. J. FINCH 2,645,000
TOOL FOR FINISHING TUBE ENDS
Filed Jan. 6, 1950 3 Sheets-Sheet 2

Inventor
Harry J. Finch
By J. R. Harris
Attorney

July 14, 1953  H. J. FINCH  2,645,000
TOOL FOR FINISHING TUBE ENDS
Filed Jan. 6, 1950  3 Sheets-Sheet 3

Inventor
Harry J. Finch
J. R. Harris
Attorney

Patented July 14, 1953

2,645,000

UNITED STATES PATENT OFFICE 2,645,000

TOOL FOR FINISHING TUBE ENDS

Harry J. Finch, Oil City, Pa., assignor to Jones & Laughlin Steel Corporation, Pittsburgh, Pa., a corporation of Pennsylvania Application January 6, 1950, Serial No. 137,047

9 Claims. (Cl. 29—57)

This invention relates to apparatus for finishing tube ends, and, more particularly, to a tool for finishing the ends of relatively thin-walled metallic tubes.

Considerable quantities of thin-walled metallic tubes are made by cold forming cold rolled strip of the proper width into tubular shapes and welding the seam electrically. This process, which is particularly adapted to the production of tubing from thin gauge material, is cheap and rapid and produces tubes of good appearance. It is also well adapted to the continuous production of tubes from coiled strip of the proper width. The product of continuous tube mills must, of course, be cut to the proper length for shipment, and this cutting operation, which generally takes place as the tubing comes from the mill, must be carried out by a rotary saw or other rapid means which leaves rough finished tube ends. For many purposes it is necessary to finish these tube ends in a separate operation, the finishing consisting in smoothly facing the rough cut ends and beveling the sharp edges of the end faces. To the best of my knowledge this operation, prior to my invention, has always been performed in a lathe or lathe type of apparatus in which the tube or the facing tool is rotated about the tube axis. Separate tools were generally employed for facing off and beveling, although a form tool could be employed to combine the two steps. This method of finishing tube ends is quite satisfactory as long as the tubes are perfectly circular in cross-section. However, thin-walled tubing frequently departs slightly from circularity, and when tubes of this type are finished in a lathe-type machine, the bevels so produced are not uniform around the circumference of the tube. No conventional lathe type of machine can produce uniform bevels on tubes of this type since the distance from the center of the rotating tube to the beveling tool is constant, whereas the radius of the tube itself varies to a greater or less degree.

It is an object, therefore, of my invention to provide a tool for finishing tube ends which will produce a uniform bevel around the circumference of a tube which is not truly circular in cross-section.

It is a further object to provide a tool which will face off and uniformly bevel the ends of such tubes in one operation. Other objects and advantages will appear in the course of the description of my invention.

My invention comprises a tool or apparatus which faces off the end of the tube and rolls uniform interior and exterior bevels on the tube end in one operation. It is adapted for use in a lathe type of machine ordinarily employed for facing off tubing. Machines of this type are familiar to those skilled in the art of producing thin-walled tubing, and comprise means for gripping the tube and holding it stationary against a head which rotates about the tube axis and carries a cutting tool which faces off the tube, or, alternatively, means for rotating the tube itself about its axis against a fixed facing tool. My invention is adaptable to either type of machine. The present preferred embodiments to be described comprise rotating apparatus adapted to finish the ends of stationary tubes, but it will be understood that my invention may be equally well embodied in stationary apparatus which operates on rotating tubes.

The facing operation carried out by my apparatus is performed by a facing tool rigidly attached to a rotating head. The cutting face of this tool is made substantially greater in width than the thickness of the tube wall so that some portion of the tool face always engages the full width of the tube wall even though the latter may move radially with respect to the tool because of departure of the tube from a truly circular cross-section. The beveling operation is performed by a pair of freely rotatable tapered rolls which straddle the tube wall, one being positioned inside and the other outside the tube. These rolls are rotatably attached to a carrier which is not rigidly mounted on the rotating head but can move laterally sufficiently to follow the contour of the tube end, even through such contour is not a circle. The rolls and their carrier are urged by a spring in the tool head against the tube, and so bear with substantially uniform pressure on the tube end, even though the distance between the rotating head and the point of contact of rolls with the tube varies. This distance is not necessarily constant until the facing tool of my apparatus has completed at least one full revolution. When the tube end has been faced off evenly by the facing tool of my apparatus, the spring maintains a constant pressure of the beveling rolls on the tube face and so assists in producing a uniform bevel around the tube.

Of the accompanying figures, Figure 1 represents an elevation of a tube end finishing tool constructed in accordance with my invention;

Figure 1:
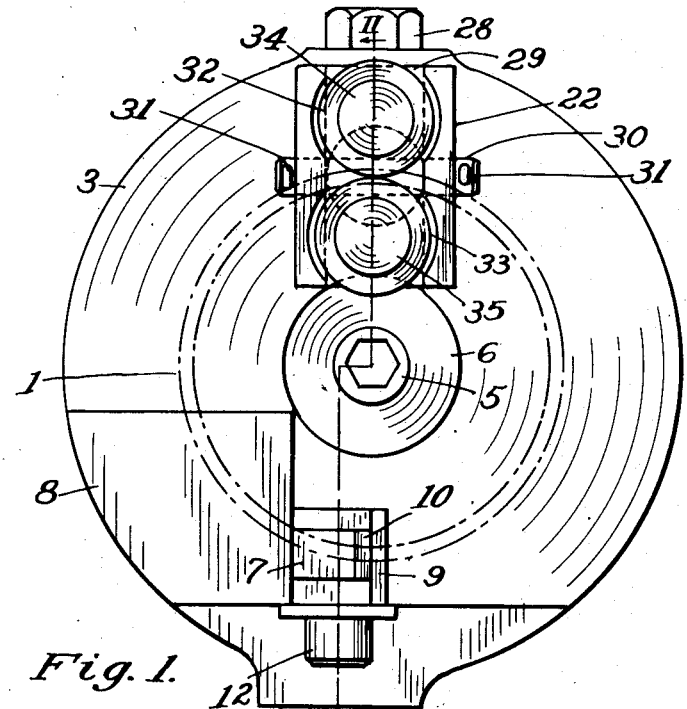
Figure 2:
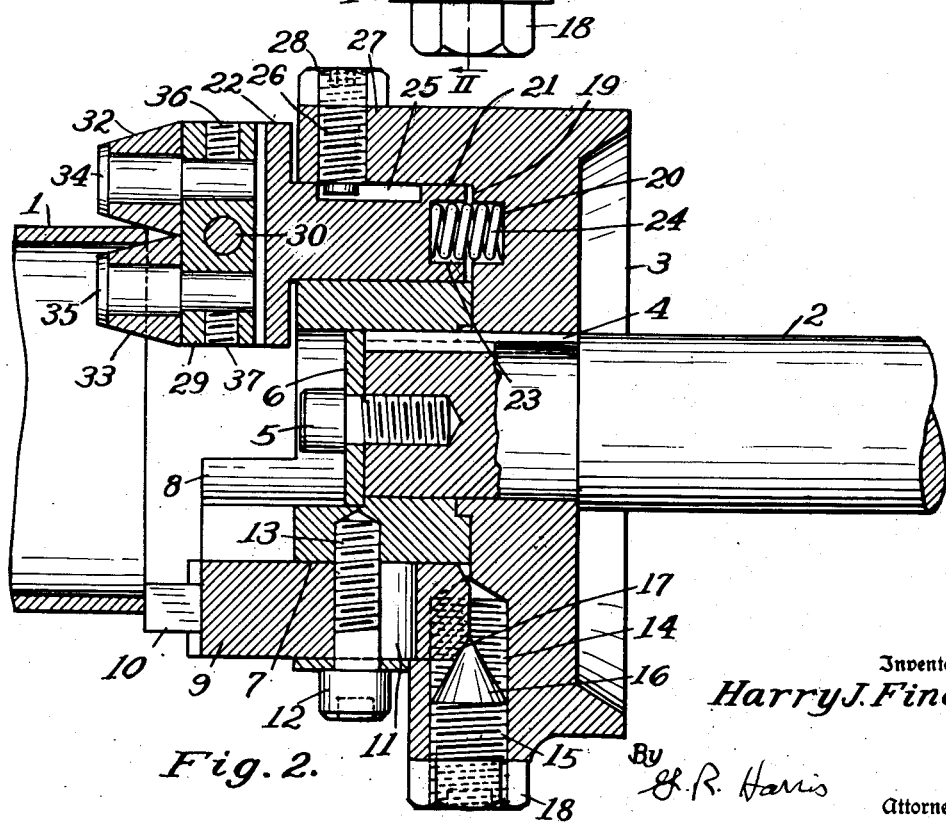
Figure 2 is a sectional view of this tool through the plane II—II of Figure 1.

Reference is first made to Figures 1 and 2. In these figures the tubing being operated upon is represented by the numeral 1. This tube is held stationary in a lathe-type machine by means not shown as they form no part of my invention. A shaft or spindle 2, which is rotated by means not shown, carries a tool head 3 which is fixed to the shaft by a key 4, a screw 5 and a washer 6. The head 3, which is generally cylindrical in shape, is provided with a recess 7 and a projecting shoulder 8. Within the recess 7 and abutting the shoulder 8 is positioned a tool holder 9 carrying a facing tool 10. The tool holder 9, which is rectangular in cross-section, is provided with an elongated hole 11 through which a screw 12 passes. The screw 12 cooperates with a tapped hole 13 in the tool head 3 to secure the tool holder 9 in place. The back end of the tool holder 9 fits into the back of the recess 7 in the tool head 3 which is provided with a tapped radial hole 14. Into this hole is threaded a set-screw 15 having a tapered end 16, which engages a beveled portion 17 of the tool holder 9. The set-screw 15 is locked in position by the nut 18.

Opposite the facing tool holder 9, the tool head 3 is provided with a second recess 19, which may be of rectangular or prismatic section and terminates in a smaller diameter recess 20. The shank 21 of the roll tool holder 22 is slidably positioned in the recess 19, and is itself provided with a recess 23 in its inner end of the same dimensions as recess 20 in the tool head. A spring 24 is restrained by the cooperating recesses 20 and 23 and urges the roll tool holder 22 away from the tool head 3. The roll tool holder shank 21 is provided with an elongated slot 25 in one face thereof, which cooperates with a stop pin 26 threaded into a tapped hole 27 in the tool head 3. A nut 28 locks the stop pin 26 in position. The slot 25 and the stop pin 26 limit the travel of the roll tool holder shank 21. Upon the outer end of the roll tool holder 22 is pivotally mounted a roll carrier 29, the pivot 30 being tangent to the mean nominal circumference of the tube 1. The pivot is secured in position in the roll tool holder 22 by cotter pins 31 at each end. The roll carrier 29 is provided with a pair of freely rotatable tapered rolls 32 and 33 mounted on shafts 34 and 35, which are held in position in the roll carrier 29 by set-screws 36 and 37 respectively. These rolls are formed so that the angle of their taper is the angle of the desired bevel to be produced on the tube end.

The construction of the apparatus of my invention as shown in Figures 1 and 2 is such that the facing tool holder 9 and roll tool holder 22 can be readily removed from the tool head 3. Appropriate tool holders must be provided for each size of pipe to be finished.

Figure 3:
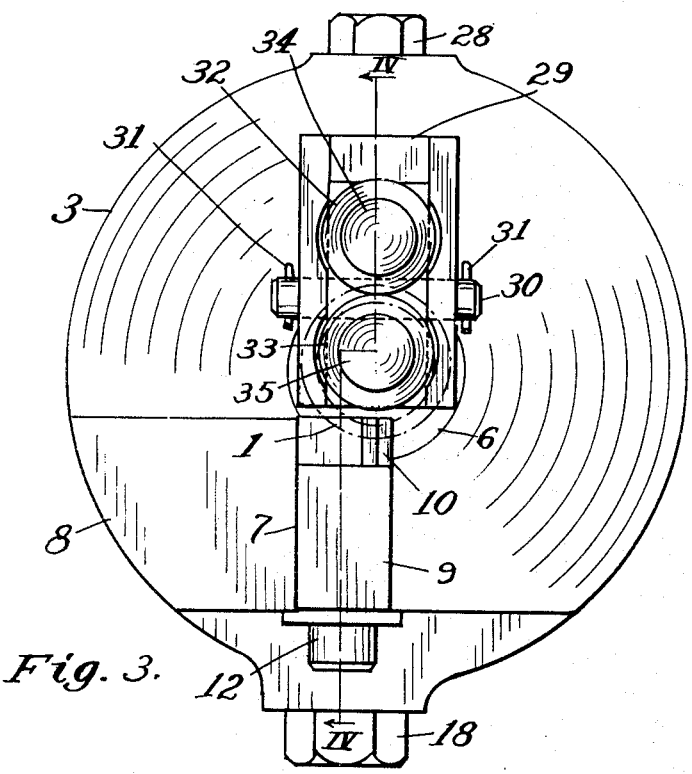
Figure 3 is an elevation of a tube end finishing tool according to my invention particularly adapted for small diameter tubing.
Figure 4:
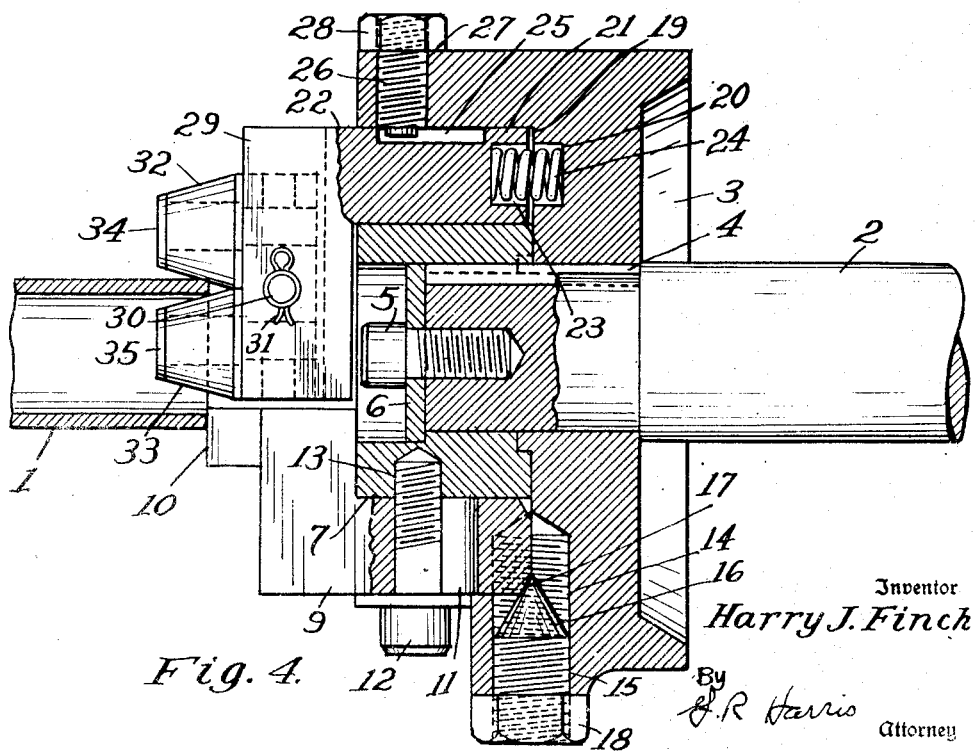
Figure 4 is a partial sectional view through the tool of Figure 3 taken on the plane IV—IV.

Figures 3 and 4 illustrate an embodiment of my invention particularly adapted for finishing small diameter tubing, which is identical with that previously described and illustrated in Figures 1 and 2 except for the form of tool holders 9 and 22. It will be observed that the facing tool holder 9 is offset so that the facing tool 10 is positioned at a distance from the tube axis which corresponds to the smaller diameter of the tube 1 being finished. The roll tool holder 22 is offset in a similar manner. From Figure 4 it will be observed that the diameter of the smallest tube which can be finished by my apparatus is determined by the diameter of the tapered rolls, one of which must be positioned inside the tube end.

Figures 5, 6, 7:
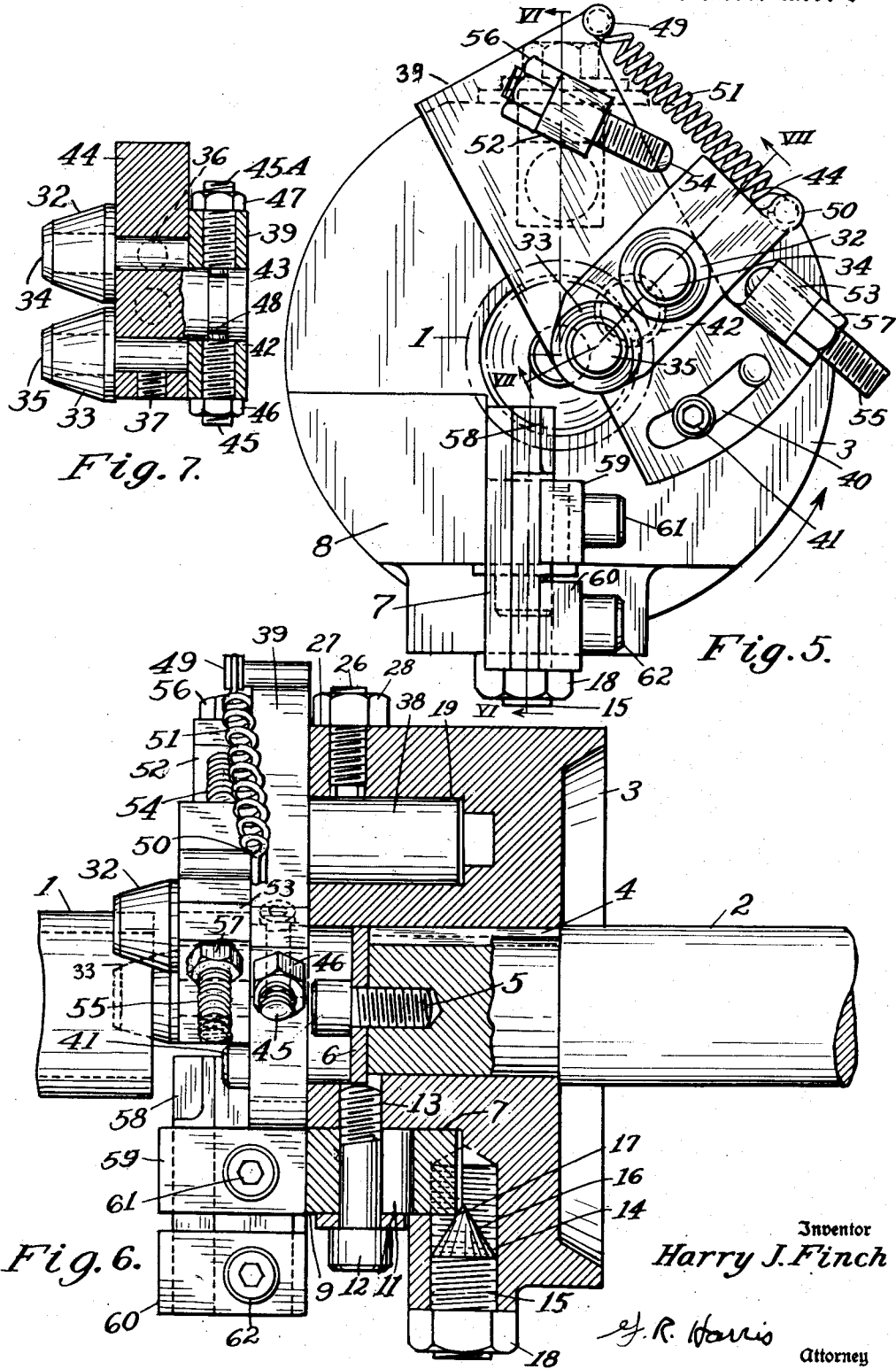
Figure 5 is an elevation of a modified form of my apparatus capable of adjustment to tubing of various sizes.
Figure 6 is a partial sectional view through the tool of Figure 5 taken on the plane VI—VI.
Figure 7 is a partial sectional view of a portion of the tool of Figure 5 taken on the plane VII—VII.

Figures 5, 6 and 7 illustrate yet another embodiment of my invention, which differs from those shown in the preceding figures in that it may be adjusted to accommodate tubing of various sizes. This apparatus is similar in many details to the previously described embodiments, as may be observed from the like-numbered parts in the various figures, but differs in the mounting of the beveling rolls. In this embodiment the recess 19 in the tool head is made cylindrical in shape and receives a cylindrical shaft 38, to which is affixed the roll tool holder 39. This tool holder 39 is a flat plate which pivots about the axis of the shaft 38 through an arc measured by the length of the slot 40. A screw 41 threaded into a tapped hole in the tool head 3 may be tightened to clamp the roll tool holder 39 in its desired position. The stop pin 26 is here used as a set-screw to clamp the cylindrical pin 38 and so assist in fixing the position of tool holder 39. The nut 28 locks the stop pin 26 in position as before.

A hole 42 is bored in the roll tool holder 39 and receives a short shaft 43 affixed to the roll carrier 44. This shaft 43 is freely rotatable in the hole 42, but is prevented from moving in or out of the hole 42 by stop pins 45 and 45-A which are threaded in holes tapped in the roll tool holder 39 and locked in position by lock nuts 46 and 47 respectively. The ends of these stop pins cooperate with the groove 48 turned in the shaft 43. The roll carrier 44 is provided with tapered rolls 32 and 33, which are freely rotatable on shafts 34 and 35 respectively, these shafts fitting in holes in the roll carrier and being held in place by set-screws 36 and 37 respectively. The roll tool holder 39 is provided with a projecting pin 49 on its upper corner, and the roll carrier 44 is provided with a like pin 50. Between these two pins is connected a tension spring 51. Affixed to the face of the roll tool holder 39 are blocks 52 and 53 carrying tapped holes in which are threaded stop pins 54 and 55 respectively, provided with lock nuts 56 and 57 respectively. These stop pins limit the arc of rotation of roll carrier 44 about the axis of the shaft 43.

The facing tool holder 9 illustrated in Figures 5 and 6 is adapted to make use of a conventional tool bit 58 which is held in position by clamps 59 and 60 secured by screws 61 and 62 respectively. The mechanism for axially adjusting the tool holder and tool is the same as illustrated in the Figures 1 through 4.

The operation of the apparatus of Figures 1 through 4 of my invention in conjunction with well-known lathe-type machines for finishing tubing will be readily understood from the foregoing description. As has been mentioned, the tube to be finished is held stationary in a chuck or similar device close behind the end to be finished, and the tool head of my invention is attached to the rotating spindle of the machine, or, alternatively, the tube is rotated and the tool head of my invention is mounted on a fixed spindle. In either case the finishing operation is begun by causing the tube end and tool head to approach each other axially until the facing tool 10 engages the tube end wall. This may be done while the tool head or tube is rotating. At the same time the facing tool is brought up against the tube end, the beveling rolls 32 and 33 also engage the tube end, but it is unnecessary to consider these in the initial positioning of the tool since the spring 24 permits the tapered rolls to accommodate themselves to the position assumed by the tube 1 with respect to the facing tool 10. The operation of facing off the tube end may be accomplished in one or more revolutions of the facing tool 10 with respect to the tube. At the same time the facing operation is proceeding, the tapered rolls are rolling internal and external bevels on the tube end, and this beveling operation is substantially concluded when the facing operation is concluded. It is not necessary to bevel as a separate operation, since it automatically proceeds concurrently with facing.

As has been mentioned, tubes which are not truly round may be finished by the apparatus of my invention just as easily as those that are perfectly circular. The cutting face of the facing tool 10 is made wide enough to accommodate variation in the radius of the tube end resulting from such out-of-roundness, and the pivoted mounting of the roll carrier 29 on the roll tool holder 22 permits the beveling rolls 32 and 33 to follow the contour of the tube end through its full circumference. The beveling rolls 32 and 33 in effect travel around the circumference of the tube independent of manufacturing variation in tube radius. The angle of bevel produced by the beveling rolls 32 and 33 varies somewhat as the rolls and roll carrier 29 tilt on the pivot 30, but this variation is negligible in tubes which are sufficiently round to be commercially acceptable. This variation in bevel angle is kept to a minimum in my apparatus by making the axis of the roll carrier pivot 30 tangential to the mean nominal circumference of the tube being finished.

The axial position of the facing tool 10 may be adjusted closely by the tapered set-screw 15 and the locking means shown. This adjustment is performed by loosening the screw 12 which holds the facing tool holder 9 against the tool head 3 and screwing down or backing off set-screw 15. It is most convenient to position the facing tool holder 9 so that its beveled end 17 abuts the tapered end of the set-screw 15 when facing tool 10 is a little short of its desired position and bring facing tool 10 to its desired position by screwing down set-screw 15. As the set-screw 15 advances, its tapered end 16 sliding on the beveled end 17 of the facing tool holder 9 forces facing tool holder 9 and facing tool 10 axially outward. The tool 10 is locked in the desired position by screwing down the locking screw 12 and the locking nut 18 on set-screw 15. In all positions within the range of its adjustment the facing tool holder 9 is supported over most of its length by the shoulder 8 against the tangential thrust produced by cutting.

The axial positioning of the beveling rolls 32 and 33 is automatically adjusted by the spring 24 as has been mentioned. As these beveling rolls are each operating on a corner of metal, the amount of pressure required to produce the relatively small bevel desired is not great and is easily furnished by the relatively small spring 24.

The operation of the apparatus of Figures 5 through 7 of my invention is not greatly different from that of the apparatus of Figures 1 and 2. Instead of requiring a separate roll tool holder and facing tool holder for each size of tube to be finished, this apparatus, as has been mentioned, may be adjusted to accommodate tubing of a considerable range of sizes. The facing tool adjustment is obvious from the drawings, particularly Figure 6. The facing tool 58 is moved in or out, depending upon the size of the tube 1 being faced, by loosening screws 61 and 62, which hold the tool clamps 59 and 60, respectively, and fixed in the desired position by retightening of these screws.

The beveling rolls 32 and 33 are brought into proper position by loosening the locking screws 26 and 41 and rotating the roll tool holder 39 about the axis of the shaft 38 until the axis of shaft 43 is separated from the axis of shaft 2 by the nominal mean radius of the tube to be finished. The roll tool holder 39 is then locked in position. The stops 54 and 55 are set to permit movement of the roll carrier 29 sufficient to allow the beveling rolls 32 and 33 to follow the circumference of the tube being finished. These stops are safety devices primarily designed to prevent damage to the tube finishing apparatus or the tube in the event the spring 51 should break during a finishing operation. The tension of spring 51 holds the beveling rolls 32 and 33 against the end of the tube 1 being finished, and allows them to follow the circumference of the tube even though it departs from circularity. It will be seen also that the beveling rolls 32 and 33 automatically adjust themselves to accommodate variation in axial distance between the point of working of the tube end and the roll carrier which may occur before the facing operation is completed. If the distance between the point of working of the end of the tube 1 and the roll carrier 44 lessens as the tool rotates, the roll carrier 44 is forced by the advance of the tube end in the tapered rolls to pivot against the pull of the spring 51, causing the contact area between bevel rolls and tube end to move inwardly along the bevel rolls. If, on the other hand, the distance between the end of the tube 1 and the roll carrier 44 increases, the pull of the spring 51 causes the roll carrier 44 to pivot in the opposite direction, so moving the area of contact outwardly along the bevel rolls. As the angle of bevel is determined solely by the taper of the beveling rolls 32 and 33, however, and the tube end wall is always centered between these rolls, the bevel rolled on the tube end is always uniform around the tube.

The beveling rolls 32 and 33 of my apparatus roll the bevel on the tube end as they travel around the tube circumference. This rolled bevel is superior in finish and uniformity to that produced by a cutting tool and enhances the appearance of the product. In the rolling of this bevel a certain amount of the metal of the tube wall is displaced, and with my apparatus this metal is displaced axially between the beveling rolls and so results in a slight elongation of the tube. As the beveling rolls do not engage the end face of the tube, the partially confined displaced metal may exhibit a slightly uneven end face, but as the facing tool of my apparatus is facing off the tube end while the beveling proceeds, this displaced metal is faced off evenly.

The apparatus of my invention is capable of handling tubes of a substantial range of wall thicknesses as the facing tool is always considerably wider than the tube wall thickness, and in every case the beveling rolls operate only on the unsupported edges of the tube end face. The depth of the bevel produced is dependent upon the force exerted by the spring 24 in Figures 2 and 4, or 51 in Figure 5, and may therefore be adjusted as desired by supplying the tool with a spring of the proper stiffness.

The embodiment of my invention illustrated in Figures 5 and 6 may display a tendency to bell or expand slightly the ends of very thin-walled tubes, but this condition may be overcome by setting the stops 54 and 55 to restrict movement of the roll carrier 44 to that required to follow the tube circumference.

Although I have described and illustrated the present preferred embodiments of my invention, it will be understood that the invention is not limited thereto but may be otherwise embodied or practiced within the scope of my claims.

I claim:

1. Apparatus for rotary finishing of tube ends comprising a head, a facing tool extending from said head and positioned to engage an end face of a tube, means for adjusting the extension of said facing tool from said head, a pair of beveling rolls extending from said head and positioned to straddle a tube wall, and autoadjustable means for varying the extension of work-engaging areas of said beveling rolls from said head so as to maintain contact between said beveling rolls and a tube end, said apparatus being adjusted and adapted to face off and bevel a tube end simultaneously.

2. Apparatus for rotary finishing of tube ends comprising a head, a facing tool having a cutting face substantially greater in width than the thickness of a tube wall extending from said head and positioned to engage an end face of a tube, a shoulder projecting from said head adapted to support said facing tool, a pair of beveling rolls extending from said head and positioned to straddle a tube wall, and autoadjustable means for varying the extension of work-engaging areas of said beveling rolls from said head so as to maintain contact between said beveling rolls and a tube end, said apparatus being adjusted and adapted to face off and bevel a tube end simultaneously.

3. Apparatus for rotary finishing of tube ends comprising a head, a facing tool extending from said head and positioned to engage an end face of a tube, means for adjusting the extension of said facing tool from said head, a roll carrier pivotally mounted on said head, a pair of freely rotatable beveling rolls mounted on said roll carrier and positioned to straddle a tube end wall, and means urging said roll carrier away from said head so as to maintain contact between said beveling rolls and a tube end, said apparatus being adjusted and adapted to face off and bevel a tube end simultaneously.

4. Apparatus for rotary finishing of tube ends comprising a head, a facing tool extending from said head and positioned to engage an end face of a tube, means for adjusting the extension of said facing tool from said head, a roll tool holder mounted on said head and capable of movement perpendicular to said head only, a roll carrier pivotally mounted on said roll tool holder, a pair of freely rotatable beveling rolls mounted on said roll carrier and positioned to straddle a tube end, and means for urging said roll tool holder away from said head so as to maintain contact between said beveling rolls and a tube end, said apparatus being adjusted and adapted to face off and bevel a tube end simultaneously.

5. Apparatus for rotary finishing of tube ends comprising a head, a facing tool extending from said head and positioned to engage an end face of a tube, means for adjusting the extension of said facing tool from said head, a roll tool holder mounted on said head and capable of movement perpendicular to said head only, a roll carrier pivotally mounted on said roll tool holder, a pair of freely rotatable beveling rolls mounted on said roll carrier and positioned to straddle a tube end, means for urging said roll tool holder away from said head so as to maintain contact between said beveling rolls and a tube end, and means limiting said movement of said roll tool holder, said apparatus being adjusted and adapted to face off and bevel a tube end simultaneously.

6. Apparatus for rotary finishing of tube ends comprising a head, a facing tool extending from said head and positioned to engage an end face of a tube, means for adjusting the extension of said facing tool from said head, a roll carrier mounted on said roll tool holder for pivotal movement about a pivot perpendicular to said head, a pair of freely rotatable beveling rolls mounted on said roll carrier and positioned to straddle a tube wall, and means urging pivotal movement of said roll carrier so as to maintain contact between said beveling rolls and a tube end, said apparatus being adjusted and adapted to face off and bevel a tube end simultaneously.

7. Apparatus for rotary finishing of tube ends comprising a head, a facing tool extending from said head and positioned to engage an end face of a tube, means for adjusting the extension of said facing tool from said head, a roll tool holder adjustably mounted on said head for pivotal movement about a first pivot perpendicular to said head, a roll carrier mounted on said roll tool holder for pivotal movement about a second pivot perpendicular to said head, a pair of freely rotatable beveling rolls mounted on said roll carrier and positioned to straddle a tube wall, and means urging pivotal movement of said roll carrier so as to maintain contact between said beveling rolls and a tube end, said apparatus being adjusted and adapted to face off and bevel a tube end simultaneously.

8. Apparatus for rotary finishing of tube ends comprising a head, a facing tool extending from said head and positioned to engage an end face of a tube, means for adjusting the extension of said facing tool from said head, a roll tool holder adjustably mounted on said head for pivotal movement about a first pivot perpendicular to said head, means for locking said roll tool holder to said head, a roll carrier mounted on said roll tool holder for pivotal movement about a second pivot perpendicular to said head, a pair of freely rotatable beveling rolls mounted on said roll carrier and positioned so as to maintain contact between said beveling rolls and a tube end, and adjustable stops mounted on said roll tool holder and positioned to limit the pivotal movement of said roll carrier, said apparatus being adjusted and adapted to face off and bevel a tube end simultaneously.

9. Apparatus for rotary finishing of tube ends comprising a head, a facing tool extending from said head and positioned to engage an end face of a tube, means for adjusting the extension of said facing tool from said head, a roll tool holder adjustably mounted on said head for pivotal movement about a first pivot perpendicular to said head, said first pivot being positioned opposite said facing tool, a roll carrier mounted on said roll tool holder for pivotal movement about a second pivot perpendicular to said head, said second pivot being positioned from said first pivot a distance less than that between said first pivot and the center of said head, a pair of freely rotatable beveling rolls mounted on said roll carrier and positioned to straddle a tube wall, and means urging pivotal movement of said roll carrier so as to maintain contact between said beveling rolls and a tube end, said apparatus being adjusted and adapted to face off and bevel a tube end simultaneously.

HARRY J. FINCH.

References Cited in the file of this patent

UNITED STATES PATENTS

| Number | Name | Date |
|---|---|---|
| 909,182 | Hart | Jan. 12, 1909 |
| 1,458,363 | Savieo | June 12, 1923 |
| 1,689,710 | Ashton | Oct. 30, 1928 |
| 2,262,178 | Gest et al. | Nov. 11, 1941 |
| 2,269,168 | Ure | Jan. 6, 1942 |
| 2,367,555 | Arney | Jan. 16, 1945 |